US010001767B2

(12) United States Patent
Takehisa (10) Patent No.: US 10,001,767 B2
(45) Date of Patent: Jun. 19, 2018

(54) PROGRAMMABLE CONTROLLER SYSTEM, PROGRAMMABLE CONTROLLER, PROGRAM DISPLAY DEVICE, AND PROGRAM DISPLAY METHOD (71) Applicant: Mitsubishi Electric Corporation, Tokyo (JP)

(72) Inventor: Takahiro Takehisa, Aichi (JP)

(73) Assignee: Mitsubishi Electric Corporation, Tokyo (JP)

(*) Notice: Subject to any disclaimer, the term of this patent is extended or adjusted under 35 U.S.C. 154(b) by 214 days.

(21) Appl. No.: 14/902,613

(22) PCT Filed: Jun. 2, 2014

(86) PCT No.: PCT/JP2014/064645
§ 371 (c)(1),
(2) Date: Jan. 4, 2016

(87) PCT Pub. No.: WO2015/186178
PCT Pub. Date: Dec. 10, 2015

(65) Prior Publication Data
US 2016/0170397 A1 Jun. 16, 2016

(51) Int. Cl.
*G06F 9/45* (2006.01)
*G05B 15/00* (2006.01)
(Continued)

(52) U.S. Cl.
CPC ............. *G05B 19/05* (2013.01); *G06F 3/048* (2013.01); *G05B 2219/14093* (2013.01)

(58) Field of Classification Search
CPC .................... G06F 3/048; G05B 19/05; G05B 2219/14093
See application file for complete search history.

(56) References Cited

U.S. PATENT DOCUMENTS 5,386,569 A 1/1995 Harada et al.
5,504,902 A * 4/1996 McGrath .................. G06F 8/33
715/703
(Continued)

FOREIGN PATENT DOCUMENTS

JP  5-274011 A  10/1993
JP  11-085224 A  3/1999
(Continued)

OTHER PUBLICATIONS

International Search Report for PCT/JP2014/064645 dated Jul. 29, 2014.

*Primary Examiner* — Marina Lee
(74) *Attorney, Agent, or Firm* — Sughrue Mion, PLLC; Richard C. Turner (57) ABSTRACT In a programmable controller system, a program display device includes: a command name conversion table; a second conversion unit that receives a program list from a programmable controller and converts a command number described in the program list into a command name on the basis of a command name conversion table; a non-corresponding command name acquisition unit that acquires a command name corresponding to a non-corresponding command number among the command numbers described in the program list on the basis of an additional command information table; and a display unit that displays the command name converted by the second conversion unit and the command name acquired by the non-corresponding command name acquisition unit.

17 Claims, 7 Drawing Sheets (51) Int. Cl.
*G05B 19/05* (2006.01)
*G06F 3/048* (2013.01)

(56) References Cited

U.S. PATENT DOCUMENTS

| | | | | |
|---|---|---|---|---|
| 5,721,722 | A * | 2/1998 | Kato | G05B 19/4183 |
| | | | | 700/2 |
| 5,881,290 | A * | 3/1999 | Ansari | G06F 8/48 |
| | | | | 700/11 |
| 5,905,891 | A | 5/1999 | Harada et al. | |
| 6,305,013 | B1 * | 10/2001 | Miyamoto | G06F 8/447 |
| | | | | 717/146 |
| 8,689,184 | B2 * | 4/2014 | Storer | G06F 8/20 |
| | | | | 717/120 |
| 2010/0114333 | A1 * | 5/2010 | Otokozawa | H04L 69/08 |
| | | | | 700/3 |
| 2010/0198781 | A1 * | 8/2010 | Yuine | G05B 19/052 |
| | | | | 707/609 |
| 2011/0270424 | A1 * | 11/2011 | Nakai | G06F 11/3604 |
| | | | | 700/87 |
| 2015/0370547 | A1 * | 12/2015 | Miura | G05B 19/056 |
| | | | | 717/113 |
| 2016/0098028 | A1 * | 4/2016 | Tanide | G05B 19/056 |
| | | | | 700/86 |

FOREIGN PATENT DOCUMENTS

| | | |
|---|---|---|
| JP | 2001-125608 A | 5/2001 |
| JP | 2001-290518 A | 10/2001 |
| JP | 2003-005809 A | 1/2003 |
| JP | 2005-038063 A | 2/2005 |
| JP | 2008-293176 A | 12/2008 |
| JP | 2009-187177 A | 8/2009 |

\* cited by examiner

FIG.8 and displays the command name together with a device code. The command name conversion table is a table that defines the association between the command name and the command number. It is possible to identify a command name that corresponds to the command number by searching for a command number in the command name conversion table. Thus, the program list is replaced with a display format of command name format "command name+ device number" and is then displayed on the program display device.

PROGRAMMABLE CONTROLLER SYSTEM, PROGRAMMABLE CONTROLLER, PROGRAM DISPLAY DEVICE, AND PROGRAM DISPLAY METHOD

CROSS REFERENCE TO RELATED APPLICATIONS

This application is a National Stage of International Application No. PCT/JP2014/064645 filed Jun. 2, 2014, the contents of all of which are incorporated herein by reference in their entirety.

FIELD

The present invention relates to a programmable controller system, a programmable controller, a program display device, and a program display method.

BACKGROUND

A program display device is connected to a programmable logic controller (PLC) which is a control device and displays information such as a program list stored in the PLC. For example, when a trouble occurs in the control of a device to be controlled by the PLC, an operator performs an operation to display the program list stored in the PLC on the program display device and investigates the cause of the trouble.

To display the program list stored in the PLC on the program display device, first, the program display device acquires the program list from the PLC. The program list is constituted by, for example, a format "command number+ device code".

The program display device converts a command number in the program list into a command name with reference to a command name conversion table provided in the program display device and displays the command name together with a device code. The command name conversion table is a table that defines the association between the command name and the command number. It is possible to identify a command name that corresponds to the command number by searching for a command number in the command name conversion table. Thus, the program list is replaced with a display format of command name format "command name+ device number" and is then displayed on the program display device.

However, when the command in the program list does not correspond to the command name conversion table provided in the program display device, it is impossible to display the command on the program display device in the command name format. For example, in some cases, when factory equipment is updated, the PLC is updated to a product with a new version, but the program display device associated with the PLC may not be updated. In this case, there is a problem that the program display device which has not been updated cannot display a new command name in a program list added to the PLC of a new version.

For example, it is assumed that the program display device corresponds to command numbers: 1000h to 1FFFh and the PLC corresponds to command numbers: 1000h to 2FFFh. In this case, a command number 2100h included in the program list of the PLC is not present in the command name conversion table of the program display device. Therefore, the program display device cannot identify a command code corresponding to the command number 2100h. Then, the program display device cannot display a command name corresponding to the command number 2100h and displays, for example, a symbol "???" indicating that the command name is unidentified.

Such problems as described above occur due to a difference in specifications between the PLC and peripheral devices thereof caused by the addition of a new function, such as the addition of a system program of the PLC. As a technique related to the addition of a system program, for example, Patent Literature 1 discloses a programmable logic controller and a logic update support tool of the programmable logic controller in which, when a command to add a system library function group is input from a support terminal device, the support terminal device combines information of function group 1 with information of function group 2 to be added to generate a system library object. Then, the system library object is downloaded to a storage unit of the PLC from which data can be read out only when the system library object is executed as a portion of an object program. Then, the system library object is updated and a PLC application is executed. Therefore, it is possible to perform an operation between the PLC and peripheral devices despite a difference in specifications therebetween.

CITATION LIST

Patent Literature

Patent Literature 1: Japanese Patent Application Laid-Open No. 2009-187177

SUMMARY

Technical Problem

However, in the technique according to the above described related art, when a command in the program list does not correspond to the program display device, the program display device cannot respond to the display of the program list in the command name format.

The present invention has been made in view of the above-mentioned problems and an object of the present invention is to provide a programmable controller system in which a program display device can easily display a program list which does not correspond to the program display device in a command name format, a programmable controller and a program display device which can form the programmable controller system, and a program display method.

Solution to Problem

To solve the above-described problem and achieve the object, a programmable controller system according to the present invention includes: a programmable controller; and a program display device that is communicably connected to the programmable controller. The programmable controller includes: a program that is described using a command number for uniquely identifying a command to control an external device; an additional command information table that defines association between a command name, which is a name corresponding to the command number, and the command number and defines association between a non-corresponding command number which is not present in a command name conversion table included in the program display device and a command name corresponding to the non-corresponding command number; and a first conversion unit that converts the non-corresponding command number into the command name on the basis of the additional command information table. The program display device includes: the command name conversion table; a second conversion unit that receives the program from the programmable controller and converts the command number described in the program into the command name on the basis of the command name conversion table; a non-corresponding command name acquisition unit that acquires the command name corresponding to the non-corresponding command number among the command numbers described in the program on the basis of the additional command information table; and a display unit that displays the command name converted by the second conversion unit and the command name acquired by the non-corresponding command name acquisition unit.

Advantageous Effects of Invention

According to the present invention, a program display device can easily display a program list which does not correspond to the program display device in a command name format.

DESCRIPTION OF EMBODIMENTS

Hereinafter, embodiments of a programmable controller system, a programmable controller, a program display device, and a program display method according to the present invention will be described in detail with reference to the drawings. The present invention is not limited to the following description and can be appropriately changed without departing from the scope and spirit of the present invention.

First Embodiment

Figure 1:
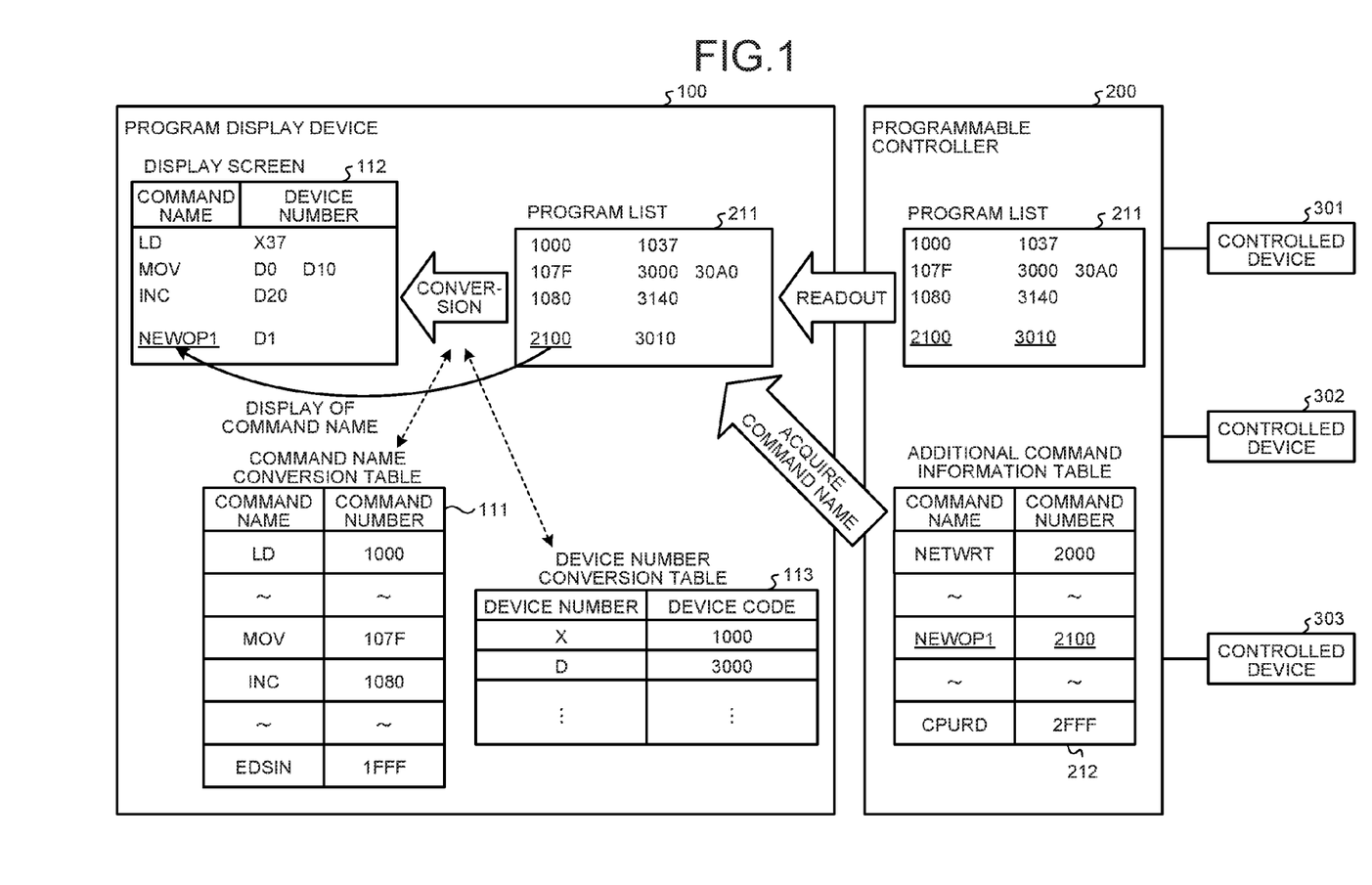
FIG. 1 is a diagram schematically illustrating the configuration of a programmable controller system according to a first embodiment of the present invention.

First, the outline of a programmable controller system according to a first embodiment will be described. FIG. 1 is a diagram schematically illustrating the configuration of the programmable controller system according to the first embodiment. The programmable controller system is a control system which is used to control, for example, a plurality of devices to be controlled. The programmable controller system includes a program display device 100 and a PLC 200 which is a control device. In the present specification, an operator means a person who operates the program display device 100.

The PLC 200 is connected to the program display device 100 and a plurality of devices to be controlled 301 to 303. The PLC 200 is provided with a program list 211 constituted with a command number and a device code stored in a user area of a memory of the PLC 200. The PLC 200 controls the plurality of devices to be controlled 301 to 303 according to the program list 211. The program list 211 will be described below.

The program display device 100 is communicably connected to the PLC 200. The program display device 100 displays the content of the program list 211 stored in the PLC 200 in a command name format. By causing the program display device 100 to display the content of the program list 211 in the command name format, for example, the operator can confirm the program list 211 included in the PLC 200 and can investigate the cause of trouble when the trouble occurs in the programmable controller system.

Next, the program list 211 will be described. The program list 211 is a list in which programs are described using command numbers that uniquely identify commands for controlling the devices to be controlled 301 to 303 which are external devices. One or a plurality of program lists 211 are stored in the PLC 200 in accordance with needs. The program list 211 is a set of programs which are data constituted by a command number and a device code. The command number and the device code are represented by, for example, hexadecimal numbers. In the following description, in some cases, h follows a number to indicate a hexadecimal number. The command number is a number which represents, by uniquely specifying, the command executable by the PLC 200. That is, one command among the commands executable by the PLC 200 is uniquely specified.

Figure 2:
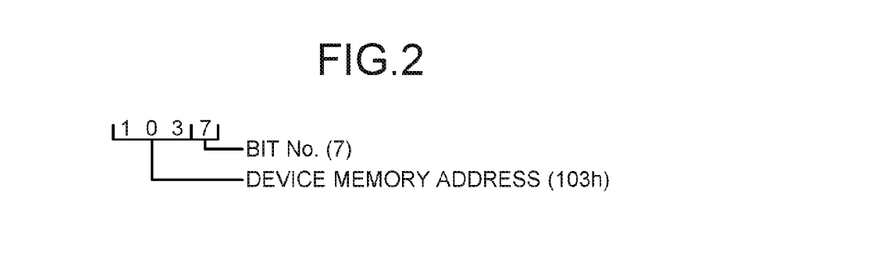
FIG. 2 is a diagram illustrating an example of the data structure of a device code.

In the program list 211 illustrated in FIG. 1, a 4-digit character string described on the left side is the command number and a 4-digit character string described on the right side of the command number is the device code. For example, the program list 211 illustrated in FIG. 1 includes data of "1000 1037". In this data, "1000" is the command number and "1037" is the device code. The device code is information indicating the address and bit number of a device memory which is an operation target of the command executable by the PLC 200. FIG. 2 is a diagram illustrating an example of the data structure of the device code. The device code illustrated in FIG. 2 is constituted by the address (103) of the device memory and the bit No. (7) of the device memory. As such, in the case the command number is embedded in the program list 211, it is possible to fix the size of the command number, regardless of the type of command.

When the program list 211 stored in the PLC 200 is displayed on a display screen 112 of the program display device 100, first, the program display device 100 reads out the program list 211 from the PLC 200. Then, the program display device 100 converts a command number in the program list 211 into a command name, using a command name conversion table 111 provided in the program display device 100, and displays the command name. In addition, the program display device 100 converts a device code in the program list 211 into a device number, using a device number conversion table 113 provided in the program display device 100. In FIG. 1, "LD", "MOV", and "INC" displayed on the display screen 112 are the names of the commands which is executable by the PLC 200 and are referred to as command names. In FIG. 1, "X37", "D0", "D10", and "D20" displayed on the display screen 112 are numbers indicating the addresses of the device memories which are operation targets of the commands that is executable by the PLC 200 and are referred to as device numbers.

The command name conversion table 111 is a table that defines the association between the command name and the command number. The program display device 100 searches for the command number of the program list 211 in the command name conversion table 111 to identify the command name corresponding to the command number. The device number conversion table 113 a table that defines the association between the device code and the device number. The program display device 100 searches for the device code of the program list 211 in the device number conversion table 113 to identify a first character of the device number corresponding to the device code. In this way, the program list 211 is replaced with a display format of command name format "command name+device number".

As can be seen from the example illustrated in FIG. 1, a command number "1080h" of the program list 211 is converted into a command number of a command "INC" by the command name conversion table 111. Therefore, the display screen 112 can display the command name "INC" which is converted from the command number "1080h" of the program list 211.

In addition, as can be seen from the example illustrated in FIG. 1, a device code "3140h" of the program list 211 is converted into a device number "D20" by the device number conversion table 113. When the device code is converted into the device number, a number which is in the thousands place of the device code, that is, a number which is in the hundreds place of the address of the device memory is converted into a first character of the device number by the device number conversion table 113. In addition, numbers which are in the hundreds place and the tens place of the device code, that is, numbers which are in the tens place and the ones place of the address of the device memory are converted from hexadecimal numbers to decimal numbers. Therefore, the program display device 100 can display the program list 211 in the PLC 200 by changing to a display format "command name+device number".

Here, it is assumed that the program display device 100 corresponds to command numbers: "1000h to 1FFFh" and the PLC 200 corresponds to command numbers: "1000h to 2FFFh". In this case, a command number: "2100h" included in the program list 211 of the PLC 200 is not present in the command name conversion table 111 of the program display device 100. Therefore, the program display device 100 cannot identify a command name corresponding to the command number: "2100h".

Therefore, the PLC 200 according to the first embodiment stores an additional command information table 212 in a non-volatile memory area of the PLC 200. The additional command information table 212 is a table that defines the association between the command number and the command name for a command which is not present in the command name conversion table 111 of the program display device 100 among the commands included in the program list 211. The additional command information table 212 is stored in a system area that is a non-rewritable non-volatile memory area and is different from a user area being a data area for storing the program list 211, and a work area being a data area used when the PLC 200 executes a program. Here, the term "non-rewritable" means that rewriting from an editing device that edits the user program of the PLC 200 is impossible.

When the program display device 100 reads out the program list 211 from the PLC 200 and displays the program list 211 on the display screen 112, if the command number in the program list 211 is not found in the command name conversion table 111 of the program display device 100, the program display device 100 acquires a command name corresponding to the command number from the additional command information table 212 in the PLC 200. According to this structure, the program display device 100 can acquire the command number which is not found in the command name conversion table 111, specify a command name corresponding to the command number, and display the command name. Therefore, the program display device 100 can display the command name of a command, which is present in the program list 211 but is not addressed by the command name conversion table 111 of the program display device 100, on the display screen 112, using the additional command information table 212 in the PLC 200.

In the example illustrated in FIG. 1, it is understood that the command number: "2100h" in the program list 211 is the command number of a command "NEWOP1" from the additional command information table 212. Therefore, the command name: "NEWOP1" which is converted from the command number: "2100h" in the program list 211 can be displayed on the display screen 112. The program display device 100 can change a program list which does not correspond to the command name conversion table 111 into a display format "command name+device number" and display the "command name+device number".

The additional command information table 212 forms a set together with firmware to which a new command is added, for example, when the version of the firmware of the PLC 200 is upgraded and is provided as version-up data to the user. The user can use the above-mentioned functions only by installing the version-up data in the PLC 200. In addition, when the PLC 200 itself is updated to a new product, the additional command information table 212 is incorporated in advance into the PLC 200 together with the firmware to which a new command has been added. Therefore, the user can use the above-mentioned functions, without performing a special process.

As described above, in the first embodiment, in the programmable controller system including the program display device 100 and the PLC 200, the PLC 200 includes the additional command information table 212. Therefore, even when the command which does not correspond to the command name conversion table 111 of the program display device 100 is present in the program list 211 read out from the PLC 200, the program display device 100 can acquire the command name which is converted on the basis of the additional command information table 212 from the PLC 200 and display the command name of the command which does not correspond to the command name conversion table 111.

In the first embodiment, there is no need to upgrade the version of the program display device 100 to display the command, which does not correspond to the command name conversion table 111 of the program display device 100, on the program display device 100. This is particularly advantageous in a program display device which is provided in factory equipment or a manufacturing apparatus. That is, the program display device 100 can respond to the display of a new command which does not correspond to the command name conversion table 111 of the program display device 100, without incurring expense and labor to upgrade the version of the program display device and stopping the facilities.

In the first embodiment, in order to display the program list on the program display device 100 neither the program display device 100 nor the PLC 200 has to have data other than the program list 211 and the conversion table, such as a source code which is a compiling source of the program list. This is particularly advantageous in the PLC 200 with a small memory capacity. That is, the memory capacity of the PLC 200 can be used for purposes required to control the device to be controlled and it is possible to effectively use a small memory capacity.

Second Embodiment

Figure 3:
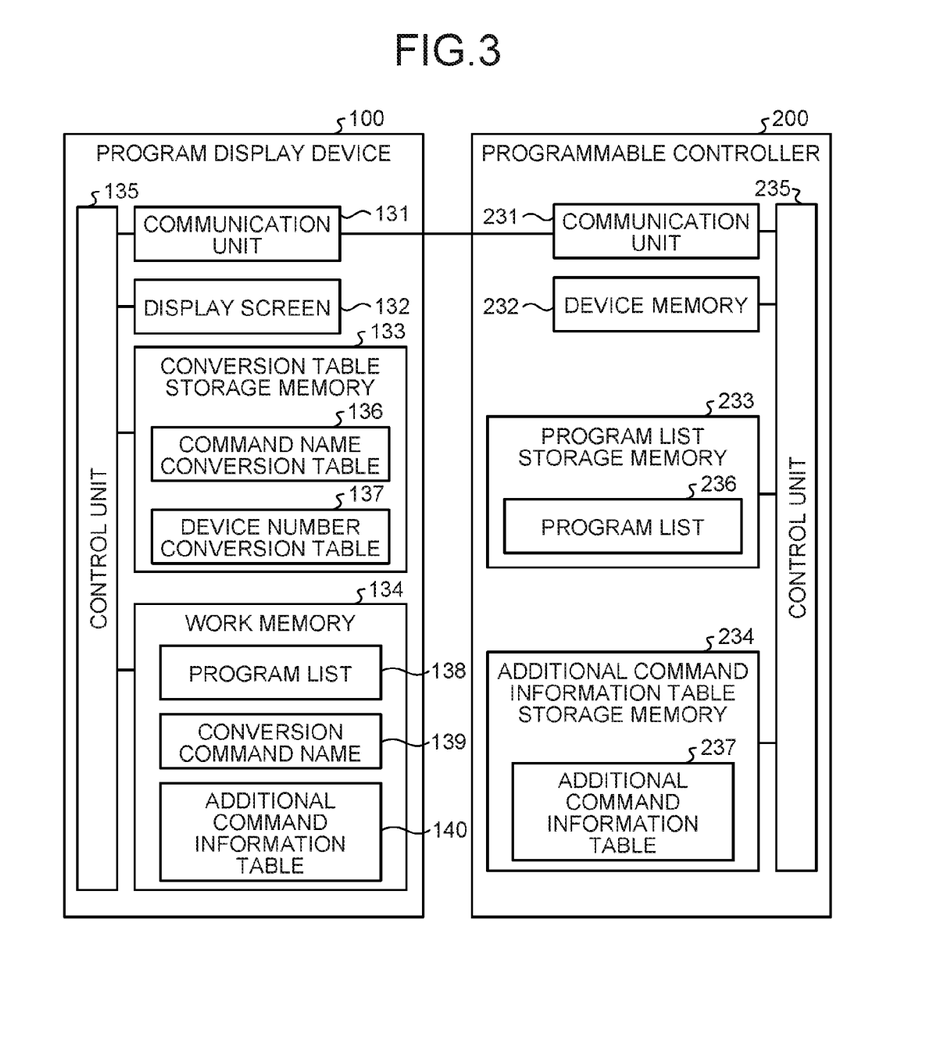
FIG. 3 is a diagram illustrating the configuration of a programmable controller system according to a second embodiment of the present invention.

In a second embodiment, a detailed example of a programmable controller system for implementing the functions described in the first embodiment will be described. FIG. 3 is a diagram illustrating the configuration of a programmable controller system according to the second embodiment.

A program display device 100 includes a communication unit 131, a display screen 132, a conversion table storage memory 133, a work memory 134, a control unit 135, a command name conversion table 136, a device number conversion table 137, a program list 138, a conversion command name 139, and an additional command information table 140. A PLC 200 includes a communication unit 231, a device memory 232, a program list storage memory 233, an additional command information table storage memory 234, a program list 236, and an additional command information table 237.

First, the configuration of the program display device 100 will be described. The communication unit 131 communicates with the communication unit 231 of the PLC 200 in order to transmit and receive data between the program display device 100 and the PLC 200. A communication means for communicating between the communication unit 131 and the communication unit 231 is not particularly limited.

The display screen 132 is a display unit which displays, for example, information of a program list 236 provided in the PLC 200 and is, for example, a liquid crystal display (LCD) device. The content of the program list 236 is converted into a format "command name+device number" and is then displayed on the display screen 132. In addition, the display screen 132 may also have, for example, the functions of a display unit and an operation input unit. The display screen 132 displays graphics and characters, detects an operation position of an operator on the display unit, and inputs input information corresponding to the operation position to the program display device 100. The operation input unit is a unit for inputting various kinds of input information and is, for example, a touch panel. The input information can be used to control the program display device 100 itself and the PLC 200 can be controlled by updating, for example, information displayed on the display unit. The display unit and the operation input unit may be separately provided.

The conversion table storage memory 133 is a memory in which the command name conversion table 136 and the device number conversion table 137 are stored. The conversion table storage memory 133 is a rewritable non-volatile memory. The command name conversion table 136 and the device number conversion table 137 are written into the conversion table storage memory 133 when the program display device 100 is shipped, that is, manufactured. The command name conversion table 136 and the device number conversion table 137 have the same configuration as the command name conversion table 111 and the device number conversion table 113 according to the first embodiment.

The work memory 134 stores, for example, the program list 138 which is read from the PLC 200, the conversion command name 139 which is a command name corresponding to a command number that is not present in the command name conversion table 136 and is transmitted from the PLC 200, the additional command information table 140 which is read from the PLC 200, and information which is generated when the program display device 100 operates. The work memory 134 is a memory and the data stored therein can be changed from a control unit 135 when the program display device 100 operates. Data stored in the work memory 134 may be deleted at an arbitrary timing, such as every time the program display device 100 starts up. The additional command information table 140 is basically read out from the PLC 200 when the program list is displayed. However, the additional command information table 140 may be stored for an arbitrary period of time after being read out. In the second embodiment, an aspect in which the additional command information table 140 is not stored in the work memory 134 will be described.

The control unit 135 controls the overall processes in the program display device 100.

Next, the configuration of the PLC 200 will be described. The communication unit 231 communicates with the communication unit 131 of the program display device 100 in order to transmit and receive data between the program display device 100 and the PLC 200. A communication means for communicating between the communication unit 231 and the communication unit 131 is not particularly limited.

The device memory 232 is a memory in which operation target data is stored when the program list 236 is executed. The device memory 232 is constituted by a non-volatile memory to which data can be rewritten by, for example, a program editor (not illustrated) or volatile memory which is initialized when the programmable controller 200 is turned on. In the device memory 232, operation target data can be designated by the device code in the program list 236.

The program list storage memory 233 is a memory in which the program list 236 is stored. The program list storage memory 233 is constituted by a non-volatile memory to which data can be rewritten using, for example, the program editor (not illustrated). The program list 236 is written into the program list storage memory 233 using, for example, the program editor (not illustrated).

The additional command information table storage memory 234 is a memory in which the additional command information table 237 is stored. A user area being a data area for storing the program list 236 and a system area of a non-volatile memory that is different from a work area being a data area used when the PLC 200 executes a program are used as the additional command information table storage memory 234. The content of the additional command information table 237 stored in the additional command information table storage memory 234 is not rewritable by, for example, the program editor (not illustrated). That is, after the additional command information table 237 is written into the additional command information table storage memory 234, it cannot be rewritten by, for example, the program editor (not illustrated). The additional command information table 237 has the same configuration as the additional command information table 212 according to the first embodiment.

A control unit 235 controls the overall processes of the PLC 200. In addition, the control unit 235 executes the program list to control a device to be controlled.

Figure 4:
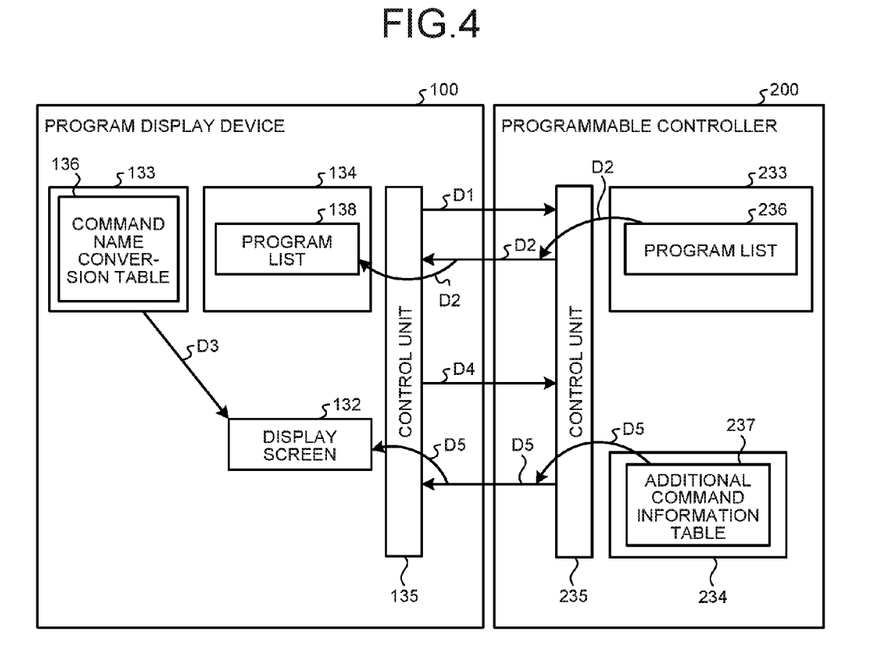
FIG. 4 is a diagram illustrating the flow of data for a program list and a command name when a program display device displays the program list read out from a PLC in the second embodiment of the present invention.
Figure 5:
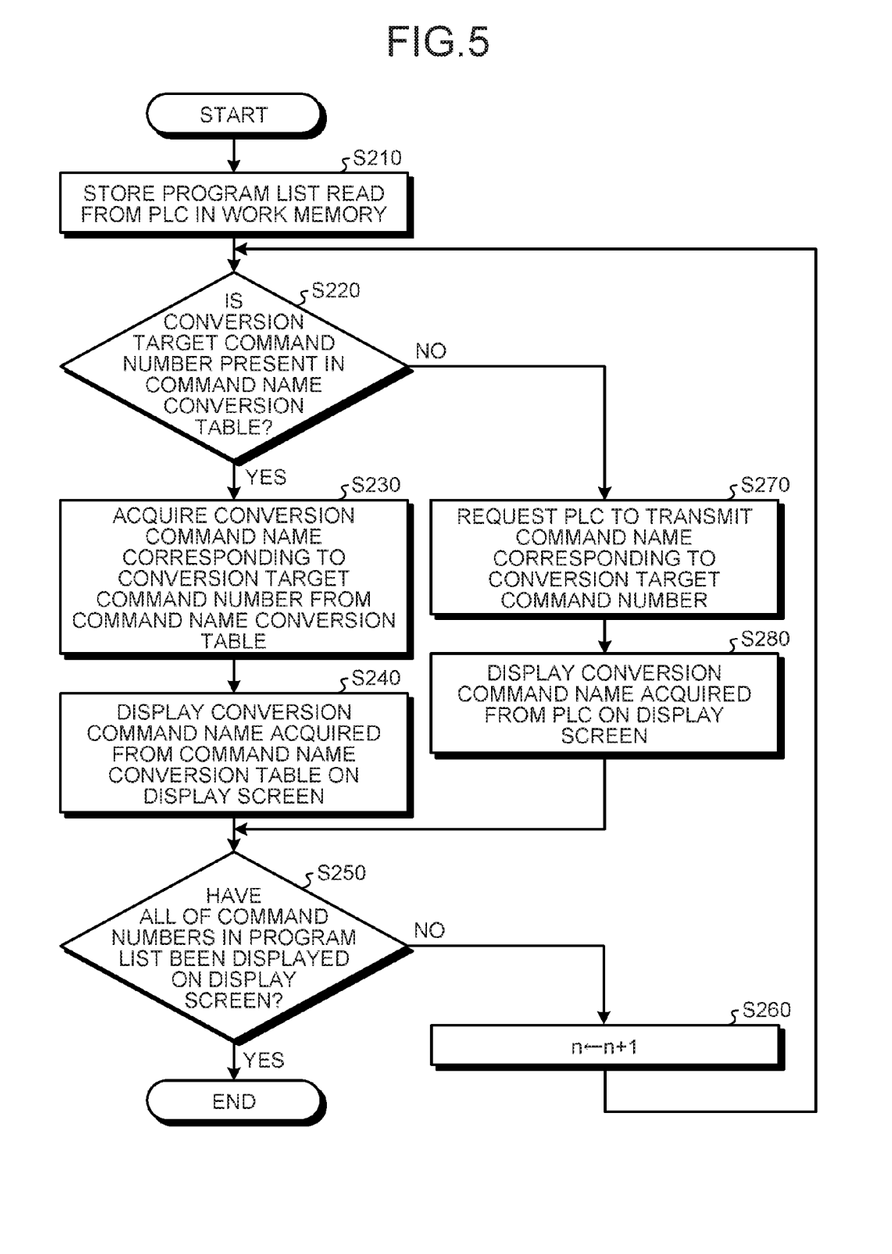
FIG. 5 is a flowchart illustrating an example of the process of the program display device displaying the program list in the second embodiment of the present invention.

Next, an example of a procedure of the program display device 100 displaying the program list read out from the PLC 200 will be described. FIG. 4 is a diagram illustrating the flow of data for the program list and the command name when the program display device 100 displays the program list read out from the PLC 200 in the second embodiment. FIG. 5 is a flowchart illustrating an example of a procedure of the program display device 100 displaying the program list according to the second embodiment.

First, the control unit 135 of the program display device 100 transmits program list request information D1 for requesting the PLC 200 to transmit the program list to the PLC 200 via the communication unit 131.

Upon receiving the program list request information D1, the control unit 235 of the PLC 200 transmits a copy of the program list 236 stored in the program list storage memory 233 as a program list D2 to the program display device 100 via the communication unit 231.

Upon receiving the program list D2, the control unit 135 of the program display device 100 stores the program list D2 as the program list 138 in the work memory 134 (Step S210). Then, the control unit 135 of the program display device 100 converts the content of the program list 138 into a format "command name+device number" and displays the "command name+device number" on the display screen 132. That is, here, the control unit 135 of the program display device 100 functions as a reading unit which reads out the program list from the PLC 200.

Then, the control unit 135 of the program display device 100 performs a display process from a first command number to an n-th command number, in numerical order, of the program list 138 stored in the work memory 134 as a conversion target command number. The control unit 135 of the program display device 100 searches the command name conversion table 136 stored in the conversion table storage memory 133 and determines whether the conversion target command number is present in the command name conversion table 136 (Step S220).

When the conversion target command number is present in the command name conversion table 136 (Step S220, Yes), the control unit 135 of the program display device 100 acquires a conversion command name D3 corresponding to the conversion target command number from the command name conversion table 136 (Step S230). Then, the control unit 135 of the program display device 100 displays the conversion command name D3 corresponding to the conversion target command number acquired from the command name conversion table 136 on the display screen 132 (Step S240). In addition, the control unit 135 of the program display device 100 converts a device code associated with the n-th command number, which is the conversion target command number, into a device number, using the device number conversion table 137, and displays the device number on the display screen 132. That is, in the present case, the control unit 135 of the program display device 100 functions as a conversion unit which converts a command number described in the program list 138 into a command name on the basis of the command name conversion table 136.

Then, the control unit 135 of the program display device 100 determines whether all of the commands in the program list 138 have been displayed on the display screen 132, that is, whether all of the commands in the program list 138 have been displayed on the display screen 132 in the format "command name+device number" (Step S250). When the command names corresponding to all of the command numbers in the program list 138 have been displayed on the display screen 132 (Step S250, Yes), a series of the display processes ends.

On the other hand, when all of the commands in the program list 138 have not been displayed on the display screen 132, that is, when all of the commands in the program list 138 have not been displayed on the display screen 132 in the format "command name+device number" (Step S250, No), the control unit 135 of the program display device 100 increments the command number, which has been searched for in the command name conversion table 136, by 1 and sets an (n+1)-th command number as the conversion target command number (Step S260). Then, the control unit 135 returns to Step S220 and performs the display process.

On the other hand, when it is determined in Step S220, after returning, that the conversion target command number is not present in the command name conversion table 136 (Step S220, No), the control unit 135 of the program display device 100 transmits command name request information D4 for requesting the transmission of a command name corresponding to the conversion target command number which is not present in the command name conversion table 136 to the PLC 200 via the communication unit 131 (Step S270). That is, the control unit 135 of the program display device 100 requests the conversion of a non-corresponding command number, which is not present in the command name conversion table 136, into a command name.

Upon receiving the command name request information D4, the control unit 235 of the PLC 200 searches the additional command information table 237 stored in the additional command information table storage memory 234 and specifies the command name corresponding to the conversion target command number requested by the program display device 100. Then, the control unit 235 of the PLC 200 transmits a conversion command name D5 corresponding to the specified conversion target command number to the program display device 100 via the communication unit 231. That is, here, the control unit 235 of the PLC 200 functions as a conversion unit which converts a non-corresponding command number into a command name on the basis of the additional command information table 237 and provides the command name to the program display device 100.

Upon receiving the conversion command name D5 corresponding to the conversion target command number which is not present in the command name conversion table 136, the control unit 135 of the program display device 100 stores the conversion command name D5 as a conversion command name 139 in the work memory 134 and displays the conversion command name D5 on the display screen 132 (Step S280). In addition, the control unit 135 of the program display device 100 converts a device code associated with an n-th command number, which is the conversion target command number, into a device number, using the device number conversion table 137, and displays the device number on the display screen 132. Therefore, the program display device 100 can convert a command which is not present in the command name conversion table 136 into a format "command name+device number" and display the "command name+device number" on the display screen 132. That is, here, the control unit 135 of the program display device 100 functions as a non-corresponding command name acquisition unit which acquires a command name corresponding to a non-corresponding command number among the command numbers described in the program list 138 on the basis of the additional command information table 237.

Then, the control unit 135 of the program display device 100 proceeds to Step S250 and continuously performs the display process. The program list 138 and the conversion command name D5 which have been read out from the PLC 200 and then stored in the work memory 134 may be deleted at an arbitrary time, such as every time the program display device 100 starts up or is stopped.

In the programmable controller system according to the second embodiment, the above-mentioned process makes it possible to convert a command which is not present in the command name conversion table 136 into the format "command name+device number" and to display the command on the display screen 132.

In the above-mentioned display method, in the process of the program display device 100 displaying the program list 138 on the display screen 132, when a command number which is not present in the command name conversion table 136 is generated, the command name request information D4 for requesting the PLC 200 to convert the command number into a command name using the additional command information table 237 is transmitted to the PLC 200. In this case, it is not necessary to provide an area for storing the additional command information table 237 in the work memory 134 of the program display device 100 and it is possible to reduce the necessary memory capacity of the program display device 100. In addition, even when the work memory 134 of the program display device 100 has a small memory capacity, the program display device 100 can display a command name which does not correspond to the command name conversion table 136 on the display screen 132 and effectively use a small memory capacity.

As described above, in the second embodiment, in the programmable controller system including the program display device 100 and the PLC 200, the PLC 200 includes the additional command information table 237. Therefore, even when a command which does not correspond to the command name conversion table 136 of the program display device 100 is present in the program list 138 read out from the PLC 200, the program display device 100 can acquire a command name which is converted on the basis of the additional command information table 237 from the PLC 200 and display the command name of the command which does not correspond to the command name conversion table 136.

In the second embodiment, there is no need to upgrade the version of the program display device 100 so as to display the command, which does not correspond to the command name conversion table 136 of the program display device 100, on the program display device 100. This is particularly advantageous in a program display device which is provided in factory equipment or a manufacturing apparatus. That is, the program display device 100 can respond to the display of a new command which does not correspond to the command name conversion table 136 of the program display device 100, without incurring expense and labor to upgrade the version of the program display device and stopping the facilities.

In the second embodiment, since the program display device 100 displays the program list 138, neither the program display device 100 nor the PLC 200 has data other than the program list and the conversion table, such as a source code which is a compile source of the program list, which is preferable. This is particularly advantageous in the PLC 200 with a small memory capacity. That is, the memory capacity of the PLC 200 can be used for purposes required to control a device to be controlled and it is possible to effectively use a small memory capacity.

In the second embodiment, whenever a command number which is not present in the command name conversion table 136 is generated, the program display device 100 transmits the command name request information D4 to the PLC 200 to request the PLC 200 to convert the command number into a command name using the additional command information table 237. Therefore, it is not necessary to provide an area for storing the additional command information table 237 in the work memory 134 of the program display device 100 and it is possible to reduce the necessary memory capacity of the program display device 100. In addition, even when the work memory 134 of the program display device 100 has a small memory capacity, the program display device 100 can display a command name which does not correspond to the command name conversion table 136 on the display screen and effectively use a small memory capacity.

Third Embodiment

Figure 6:
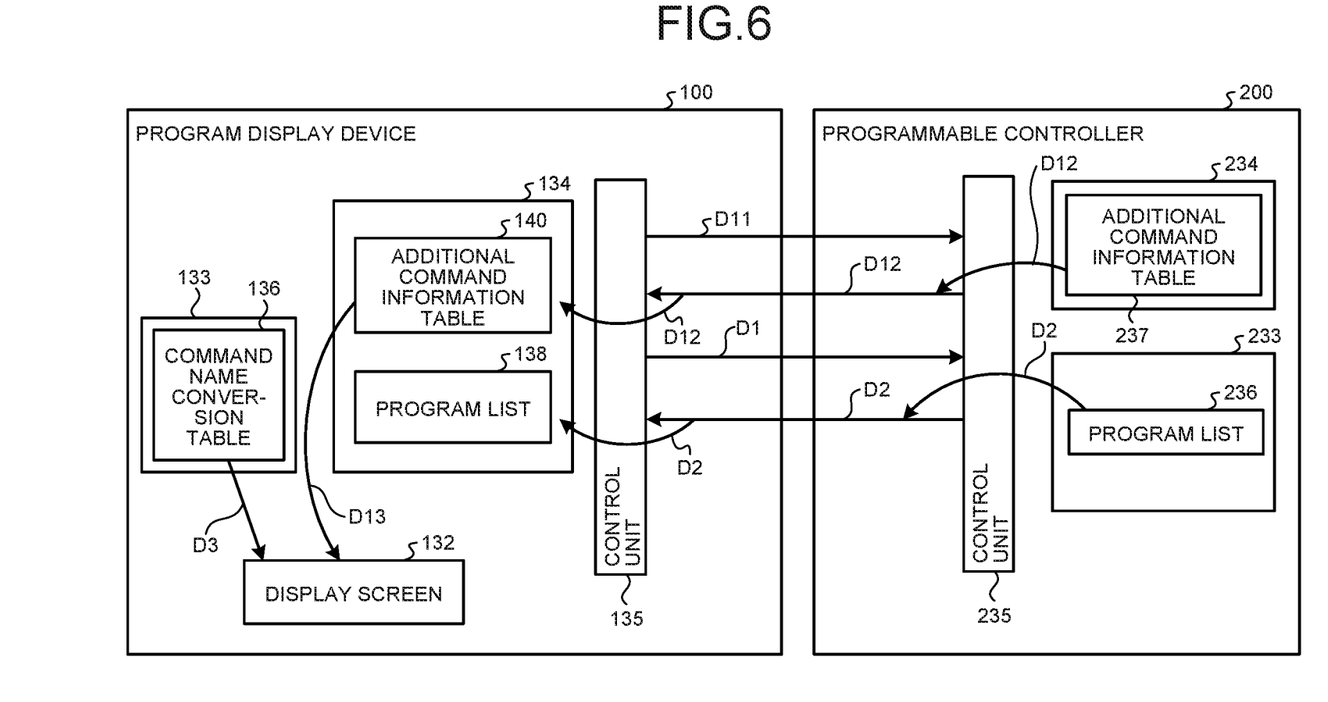
FIG. 6 is a diagram illustrating the flow of various kinds of data when a program display device displays a program list read out from a PLC in a third embodiment of the present invention.
Figure 7:
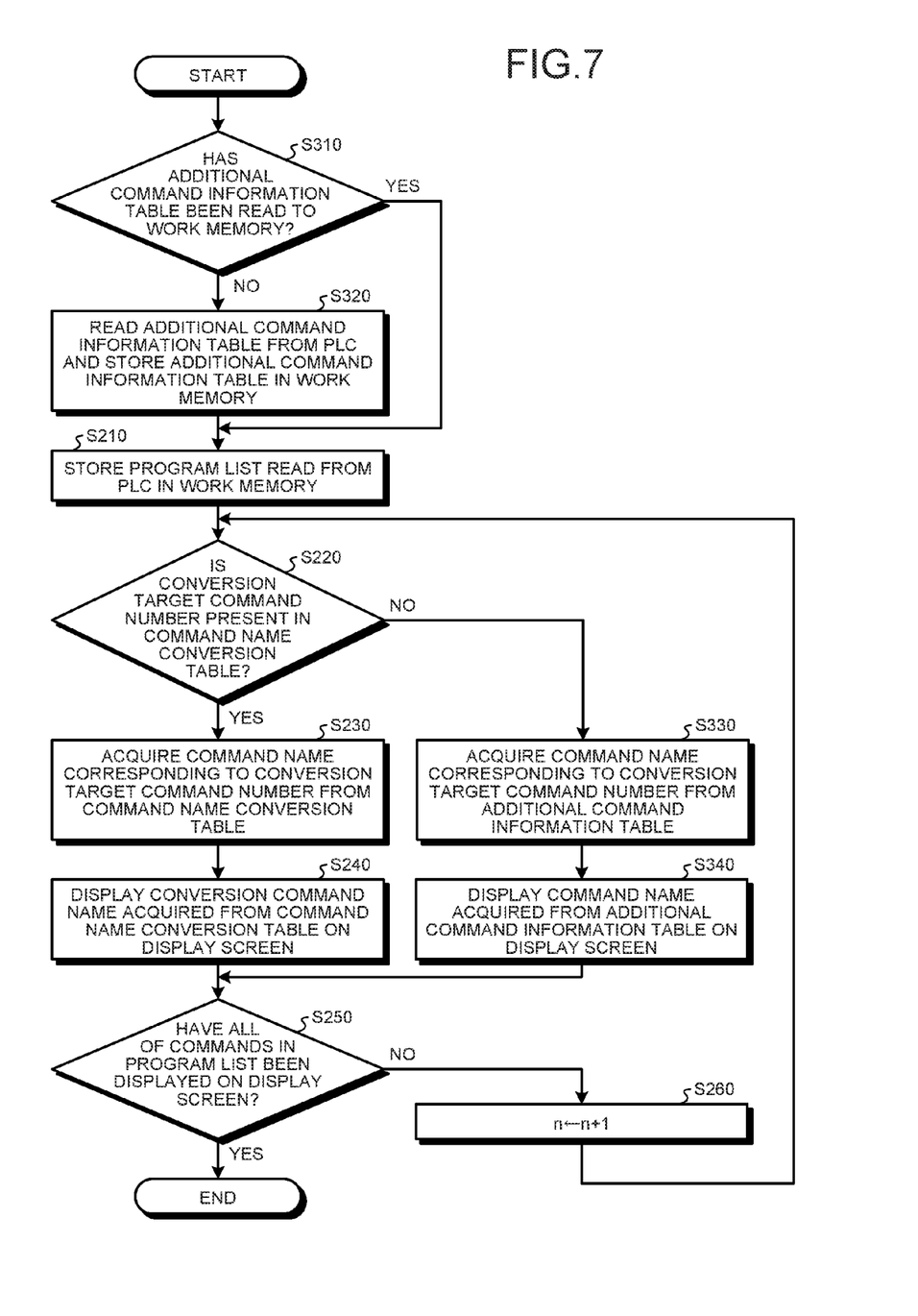
FIG. 7 is a flowchart illustrating an example of the process of the program display device displaying the program list in the third embodiment of the present invention.

In a third embodiment, an aspect in which an additional command information table 140 is stored in the work memory 134 when the program display device 100 reads out the program list from the PLC 200 in the programmable controller system having the structure according to the second embodiment will be described. FIG. 6 is a diagram illustrating the flow of various kinds of data when the program display device 100 displays the program list read out from the PLC 200 in the third embodiment. FIG. 7 is a flowchart illustrating an example of the procedure of the program display device 100 displaying the program list in the third embodiment.

First, the control unit 135 of the program display device 100 determines whether the additional command information table has been read out to the work memory 134 (Step S310). When the additional command information table has not been read out to the work memory 134 (Step S310, No), the control unit 135 of the program display device 100 transmits additional command information table request information D11 for requesting the PLC 200 to transmit the additional command information table to the PLC 200 via the communication unit 131.

Upon receiving the additional command information table request information D11, the control unit 235 of the PLC 200 transmits a copy of the additional command information table 237 stored in the additional command information table storage memory 234 as an additional command information table D12 to the program display device 100 via the communication unit 231.

Upon receiving the additional command information table D12, the control unit 135 of the program display device 100 stores the additional command information table D12 as the additional command information table 140 in the work memory 134 (Step S320). That is, the control unit 135 of the program display device 100 functions as a reading unit which reads out the additional command information table 140 from the PLC 200.

On the other hand, when the additional command information table has been already read out to the work memory 134 (Step S310, Yes), the process proceeds to Step S210.

Then, the control unit 135 of the program display device 100 reads out the program list from the PLC 200, converts the content of the program list 138 into a format "command name+device number" and displays the "command name+ device number" on the display screen 132. Here, the process of displaying the content of the program list 138 using the command name conversion table 136 is the same as that from Step S210 to Step S260 in the second embodiment.

On the other hand, when it is determined in Step S220 that the conversion target command number is not present in the command name conversion table 136 (Step S220, No), the control unit 135 of the program display device 100 searches the additional command information table 140 stored in the work memory 134, specifies a command name corresponding to the conversion target command number which is not present in the command name conversion table 136, and acquires the command name (Step S330). Then, the control unit 135 of the program display device 100 displays a conversion command name D13 corresponding to the conversion target command number which is not present in the command name conversion table 136 on the display screen 132 (Step S340).

In addition, the control unit 135 of the program display device 100 converts a device code associated with an n-th command number, which is the conversion target command number, into a device number, using the device number conversion table 137, and displays the device number on the display screen 132. Therefore, the program display device 100 can convert a command which is not present in the command name conversion table 136 into a format "command name+device number" and display the command on the display screen 132. In addition, it is not necessary to store the conversion command name D13 in the work memory 134, unlike the second embodiment.

In the above-mentioned display method, in the process of displaying the program list 138 on the display screen 132 of the program display device 100, when a command number which is not present in the command name conversion table 136 is generated, the control unit 135 of the program display device 100 converts the command number into a command name, using the additional command information table 140 stored in the work memory 134. In this case, the necessary capacity of the work memory 134 increases, as compared to the second embodiment. However, once the additional command information table 140 is read out to the work memory 134, the program display device 100 can advantageously reuse the additional command information table 140 stored in the work memory 134 to display the program list thereafter. Therefore, it is possible to reduce the amount of communication between the program display device 100 and the PLC 200. In addition, it is possible to convert a command number into a command name, using the additional command information table 140, without performing communication between the program display device 100 and the PLC 200. Therefore, a display processing time is shorter than that in the second embodiment.

As described above, in the third embodiment, in the programmable controller system including the program display device 100 and the PLC 200, the additional command information table 140 is read out from the PLC 200. Therefore, even when a command which does not correspond to the command name conversion table 136 of the program display device 100 is present in the program list 138 read out from the PLC 200, the program display device 100 acquires the command name which is converted on the basis of the additional command information table 140 read out from the PLC 200. As a result, the program display device 100 can display the name of a non-corresponding command.

In the third embodiment, there is no need to upgrade the version of the program display device 100 in order to cause the program display device 100 display the command which does not correspond to the command name conversion table 136 of the program display device 100. This is particularly advantageous in a program display device which is provided in factory equipment or a manufacturing apparatus. That is, the program display device 100 can respond to the display of a new command which does not correspond to the command name conversion table 136 of the program display device 100, without incurring expense and labor to upgrade the version of the program display device and stopping the facilities.

In the third embodiment, the program display device 100 converts a command number into a command name, using the additional command information table 140 stored in the work memory 134. Once the additional command information table 140 is read out to the work memory 134, thereafter the program display device 100 can reuse the additional command information table 140 stored in the work memory 134 to display the program list. Therefore, it is possible to reduce the amount of communication between the program display device 100 and the PLC 200. In addition, the program display device 100 can convert a command number into a command name, using the additional command information table 140, without performing communication with the PLC 200. Therefore, a display processing time is shorter than that of the second embodiment.

Next, techniques according to comparative examples which are considered as countermeasures when a command in the program list does not correspond to the command name conversion table stored in the program display device will be described.

Comparative Example 1

When the PLC newly supports processing for a command in the program list which cannot be displayed by the program display device, a method which directly embeds a character string of a command name into the program list of the PLC can be considered. When a command is embedded in a command name format in the program list read out from the PLC, the program display device can directly display a command name on a program display screen, without referring to the command name conversion table. However, when the character string of the command name is directly embedded in the program list, the following two problems arise.

(1) The command processing time in the PLC increases.

First, an implementation example of the function of performing a command process on the basis of the command number in the program list will be described. The PLC has a command address table in which a command number and a command process are associated with each other. For example, a value (command number−1000) obtained by subtracting 1000 from a command number is used as an index number of the command address table. In the command address table, the command address of the command process is associated with the index number. Therefore, the command address of the command process to be performed can be specified from the command number by performing index calculation which subtracts 1000 from the command number, using the command address table.

Next, an implementation example of the function of performing a command process on the basis of the command name in the program list will be described. The PLC which can perform the command process on the basis of the command name in the program list has a command name table in which the command name and the command process are associated with each other. The PLC sequentially searches the command name table, specifies a command process associated with the command name to be performed, and performs the specified command process.

However, in this case, it is necessary to sequentially search the command name table whenever a command embedded in the character string of the command name is executed. Therefore, in the method which executes the command embedded in the character string of the command name, the processing time tends to be longer than that in the method which performs the command process on the basis of the command number.

(2) The size of the program list is increased by a value corresponding to the number of characters in the character string of the command name.

In a method in which the command number is embedded into the program list, the size of the command number can be fixed regardless of the type of command. For example, when the number of commands is equal to or less than 4096, the command number can be represented by numerical data with a length of 12 bits.

However, when the character string of the command name is directly embedded into the program list, the length of the character string required to represent the same command increases and the size of the program list increases by a value corresponding to the number of characters in the character string of the command name. However, in the program list 211 and the program list 236 according to the above-described embodiments, the command number corresponding to the command name is described with a predetermined data size. Therefore, the data size of the program list does not increase in proportion to the length of the command name.

Comparative Example 2

Program display data and a program list are stored in the PLC together. The program display data is data to be used by the program display device to display the content of the program list on the display screen, without using the command name conversion table. For example, the program display data includes program editing and display text with a format displayed on the display screen and display text. However, when the program display data is stored together with the program list, the following two problems arise.

(1) A free space for a user data storage memory in the PLC decreases.

Since the program display data is formed so as to correspond to the program list, it has high capacity similarly to the program list. Since the program display data with high capacity is stored in the memory of the PLC, the free space of the user data storage memory in the PLC decreases. In a case in which the program list and the program display data are stored in a common memory area in the PLC, when the program display data is stored in the PLC, the size of the program list which can be stored in the PLC decreases.

(2) In some cases, the program list is dissociated from the program display data.

When the PLC is not provided with a structure which uniquely associates the program list with the program display data, the program list may be dissociated from the program display data. When the program list is dissociated from the program display data in the PLC, in some cases, a program having different content from the program list which is executed by the PLC is erroneously displayed on the display screen of the program display device. For example, when there is a means for changing only the program editing and display text, a program having different content from the program list which is executed by the PLC is likely to be displayed even though the program display device reads out the program editing and display text from the PLC and displays the program editing and display text on the display screen.

In contrast, in the programmable controller system according to the above-described embodiments, the additional command information table is searched with a command number to specify a command name. Therefore, it is possible to convert a command number into a command name in a short time. As a result, it is possible to display the program list on the program display device for a short command processing time.

In the above-described embodiments, the additional command information table is a table that defines the association between the command number and the command name only for a command which is not present in the command name conversion table of the program display device among the commands included in the program list. Therefore, the size of the additional command information table according to the above-described embodiments is significantly less than that of the program list and the program display data. As a result, no load is applied to the free space of the memory in the PLC and the free space of the memory in the program display device.

In the additional command information table according to the above-described embodiments, the command number and the command name are uniquely associated with each other for the command which is not present in the command name conversion table of the program display device among the commands included in the program list. The additional command information table is stored in the memory, to which the written content is not rewritable, in the PLC. Therefore, content different from the content of the program list is prevented from being displayed on the program display device. When the additional command information table is stored in the work memory of the program display device, it is possible to prevent the dissociation between the content of the program list and the content displayed on the program display device due to, for example, a change in the additional command information table when each operator reads the additional command information table from the PLC to the program display device.

Fourth Embodiment

Figure 8:
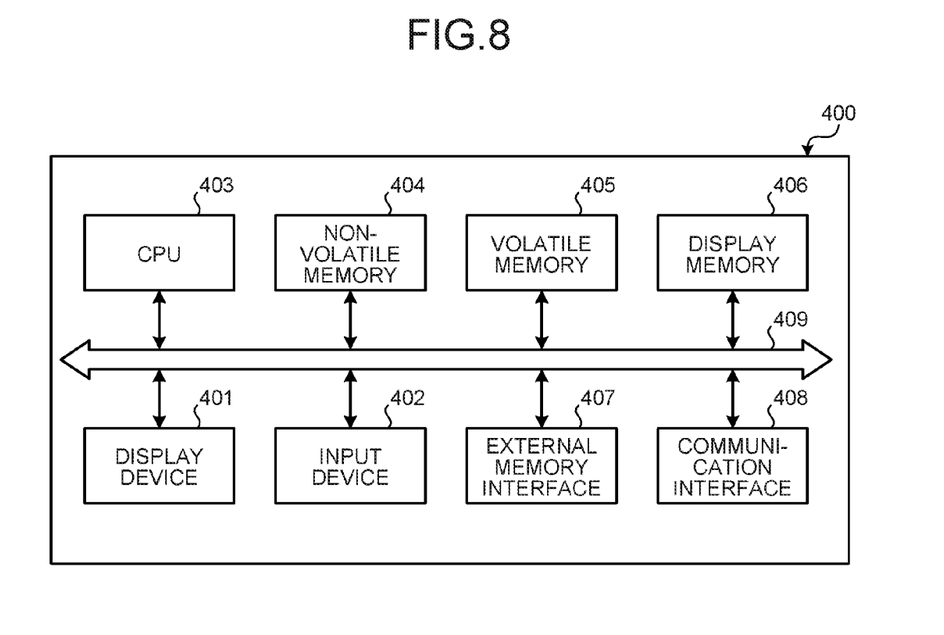
FIG. 8 is a block diagram schematically illustrating an example of the configuration of a computer device which realizes the functions of the program display devices and the PLCs according to the first to third embodiments.

A display method which is performed by the program display device and the PLC according to the above-described embodiments can be realized by a program in which processes of the display method are stored and a computer device including, for example, a CPU and a storage device illustrated in FIG. 8 can execute the program to implement the display method.

FIG. 8 is a block diagram schematically illustrating an example of the configuration of a computer device 400 which realizes the functions of the program display devices and the PLCs according to the first to third embodiments. As illustrated in FIG. 8, the computer device 400 includes, for example, a display device 401, such as a liquid crystal display (LCD), an input device 402, such as a keyboard, a CPU 403 which performs calculation, non-volatile memory 404, such as read only memory (ROM), volatile memory 405, such as random access memory (RAM), a display memory 406 which stores a display screen displayed on the display device 401, an external memory interface 407 which is an interface with a detachable external memory, such as a flash memory, and a communication interface 408 for communication with an external device, which are connected to each other via a bus 409. In addition, the display device 401 and the display memory 406 may not be provided.

The program which is stored in the non-volatile memory 404 and in which the procedures of the display method are described is loaded to the volatile memory 405 and is then executed by the CPU 403. The program may be recorded in a computer-readable recording medium, such as a hard disk, a compact disk (CD)-read only memory (ROM), a magneto-optical disk (MO), or a digital versatile disk or a digital video disk (DVD), or the program may be distributed through a network (communication line) such as the Internet. In this case, the program is read from an information processing terminal which is connected through the communication interface 408 and is then stored in the non-volatile memory 404.

INDUSTRIAL APPLICABILITY

As described above, the programmable controller system according to the present invention is useful when the program display device displays the program list in a command name format.

REFERENCE SIGNS LIST 100 program display device
111 command name conversion table
112 display screen
113 device number conversion table
131 communication unit
132 display screen
133 conversion table storage memory
134 work memory
135 control unit
136 command name conversion table
137 device number conversion table
138 program list
139 CONVERSION command name
140 additional command information table
211 program list
212 additional command information table
231 communication unit
232 device memory
233 program list storage memory
234 additional command information table storage memory
235 control unit
236 program list
237 additional command information table
301, 302, 303 device TO BE controlled
400 computer device
401 display device
402 input device
403 CPU
404 non-volatile memory
405 volatile memory
406 display memory
407 external memory interface
408 communication interface
409 bus
D1 program list request information
D2 program list
D3 CONVERSION command name
D4 command name request information
D5 conversion command name
D11 additional command information table request information
D12 additional command information table
D13 conversion command name

The invention claimed is:

1. A programmable controller system comprising:
a programmable controller; and
a program display device that is communicably connected to the programmable controller,
wherein the programmable controller includes:
a program that is described using a command number for uniquely identifying a command to control an external device;
a memory comprising an area to which data is not rewritable by an external device capable of editing the program, the area storing an additional command information table that defines an association between a command name, which is a name corresponding to the command number, and the command number and defines an association between a non-corresponding command number which is not present in a command name conversion table included in the program display device and a command name corresponding to the non-corresponding command number; and
a first converter that converts the non-corresponding command number into the command name corresponding to the non-corresponding command number on the basis of the additional command information table, and
the program display device includes:
the command name conversion table;
a second converter that receives the program from the programmable controller and converts the command number described in the program into the command name corresponding to the command number on the basis of the command name conversion table;
a non-corresponding command name acquirer that acquires the command name corresponding to the non-corresponding command number among command numbers described in the program on the basis of the additional command information table; and
a display that displays the command name converted by the second converter and the command name acquired by the non-corresponding command name acquirer.

2. The programmable controller system according to claim 1,
wherein the non-corresponding command name acquirer acquires the command name corresponding to the non-corresponding command number from the programmable controller.

3. The programmable controller system according to claim 2,
wherein the non-corresponding command name acquirer requests the programmable controller to transmit the command name corresponding to the non-corresponding command number, and
the first converter transmits the command name corresponding to the non-corresponding command number to the program display device, on the basis of the additional command information table, in response to the request.

4. The programmable controller system according to claim 1,
wherein the program display device further includes:
a reader that reads the additional command information table from the programmable controller; and
a storage that stores the additional command information table, and when the non-corresponding command number is generated in the program, the non-corresponding command name acquirer acquires the command name corresponding to the non-corresponding command number on the basis of the additional command information table stored in the storage.

5. The programmable controller system according to claim 1,
wherein the memory is a non-volatile memory.

6. The programmable controller system according to claim 1,
wherein the command name corresponding to the non-corresponding command number is not included in version-up data which is stored in the program display device in order to upgrade a version of a function of the program display device.

7. The programmable controller system according to claim 1,
wherein the program display device does not have a source code which is a compiling source of the program.

8. The programmable controller system according to claim 1,
wherein the command number is described with a predetermined data size in the program.

9. A program display device that is communicably connected to a programmable controller, the programmable controller comprising a program that is described using a command number for uniquely identifying a command to control an external device, to form a programmable controller system, the program display device comprising:
a command name conversion table that defines an association between a command name, which is a name corresponding to the command number, and the command number;
a converter that receives the program from the programmable controller and converts the command number described in the program into the command name on the basis of the command name conversion table;
a non-corresponding command name acquirer that acquires a command name corresponding to a non-corresponding command number which is not present in the command name conversion table among command numbers described in the program, on the basis of an additional command information table, included in the programmable controller, that defines an association between the non-corresponding command number which is not present in the command name conversion table and the command name corresponding to the non-corresponding command number; and
a display screen that displays the command name converted by the converter and the command name acquired by the non-corresponding command name acquirer.

10. The program display device according to claim 9,
wherein the non-corresponding command name acquirer acquires the command name corresponding to the non-corresponding command number from the programmable controller having the additional command information table.

11. The program display device according to claim 9,
further comprising:
a reader that reads the additional command information table from the programmable controller having the additional command information table; and
a storage that stores the additional command information table, and wherein the non-corresponding command name acquirer acquires the command name corresponding to the non-corresponding command number in the program on the basis of the additional command information table stored in the storage.

12. The program display device according to claim 9,
wherein the command name corresponding to the non-corresponding command number is not included in version-up data which is stored in the program display device in order to upgrade a version of a function of the program display device.

13. The program display device according to claim 9,
wherein the program display device does not have a source code which is a compiling source of the program.

14. The program display device according to claim 9,
wherein the command number is described with a predetermined data size in the program.

15. A programmable controller that has a program, which is described using a command number for uniquely identifying a command to control an external device, and is communicably connected to a program display device to form a programmable controller system, the programmable controller comprising:
a memory comprising an area to which data is not rewritable by an external device capable of editing the program, the area storing an additional command information table that defines an association between a command name, which is a name corresponding to the command number, and the command number and defines an association between a non-corresponding command number which is not present in a command name conversion table included in the program display device and a command name corresponding to the non-corresponding command number; and
a converter that converts the non-corresponding command number into the command name corresponding to the non-corresponding command number, on the basis of the additional command information table, in response to a request from the program display device and transmits the command name corresponding to the non-corresponding command number to the program display device.

16. The programmable controller according to claim 15,
wherein the memory is a non-volatile memory.

17. A program display method that displays a program, which is described using a command number for uniquely identifying a command to control an external device, on a program display device, the program display method comprising:
converting the command number described in the program into a command name, which is a name corresponding to the command number, on the basis of a command name conversion table, included in the program display device, that defines an association between the command name and the command number;
acquiring a command name corresponding to a non-corresponding command number which is not present in the command name conversion table among command numbers described in the program, on the basis of an additional command information table, included in a programmable controller, that defines an association between the non-corresponding command number which is not present in the command name conversion table and the command name corresponding to the non-corresponding command number; and displaying the command name converted in the converting and the command name acquired in the acquiring.

* * * * *